US008942688B2

(12) United States Patent
Kirchhoff et al.

(10) Patent No.: US 8,942,688 B2
(45) Date of Patent: *Jan. 27, 2015

(54) METHODS AND SYSTEMS FOR CALL PROCESSING IN A WIRELINE AND WIRELESS NETWORK

(71) Applicant: Callwave Communications, LLC, Santa Barbara, CA (US)

(72) Inventors: Leland W. Kirchhoff, Santa Barbara, CA (US); David S. Trandal, Santa Barbara, CA (US)

(73) Assignee: Callwave Communications, LLC, Brookline, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/218,444

(22) Filed: Mar. 18, 2014

(65) Prior Publication Data

US 2014/0206364 A1 Jul. 24, 2014

Related U.S. Application Data

(63) Continuation of application No. 13/798,963, filed on Mar. 13, 2013, now Pat. No. 8,682,305, which is a continuation of application No. 13/450,113, filed on Apr. 18, 2012, now Pat. No. 8,401,533, which is a (Continued)

(51) Int. Cl.
*H04M 3/42* (2006.01)
*H04M 1/56* (2006.01)

(Continued)

(52) U.S. Cl.
CPC .......... *H04W 40/02* (2013.01); *H04M 3/42263* (2013.01); *H04M 3/4228* (2013.01);

(Continued)

(58) Field of Classification Search
USPC .................. 455/417, 426.1, 445; 379/211.01, 379/211.02, 142.04, 142.07, 142.15, 212.01
See application file for complete search history.

(56) References Cited

U.S. PATENT DOCUMENTS 3,936,613 A 2/1976 Nishigori et al.
3,956,595 A 5/1976 Sobanski (Continued)

FOREIGN PATENT DOCUMENTS

CA 1329852 9/1989
EP 1120954 8/2001

(Continued)

OTHER PUBLICATIONS

Johnson, D., "Now You're Talking—voice-response systems for home offices—Product Information"; http://www.findarticles.com, Feb. 1999.

(Continued)

*Primary Examiner* — George Eng
*Assistant Examiner* — Nam Huynh
(74) *Attorney, Agent, or Firm* — Knobbe, Martens, Olson & Bear LLP

(57) ABSTRACT

Methods and systems are described for routing call in a wireless network environment. In one embodiment, a phone address is assigned to a subscriber and/or a subscriber's mobile telecommunications device. A call directed to the phone address is routed to a call processing system. An outbound call from the call processing system is placed to a wireless communication service provider so as to cause, at least in part, the wireless communication service provider to route the outbound call to the subscriber's mobile telecommunications device, wherein the call processing system configures call signaling parameters associated with the outbound call so that the outbound call appears to be to a phone number ported to the wireless communication service provider, and wherein the phone number has not been ported to the wireless communication service provider. The outbound call is bridged with the inbound call.

40 Claims, 4 Drawing Sheets

Related U.S. Application Data continuation of application No. 11/676,479, filed on Feb. 19, 2007, now Pat. No. 8,165,572.

(60) Provisional application No. 60/775,601, filed on Feb. 22, 2006.

(51) Int. Cl.

| | | |
|---|---|---|
| *H04W 4/00* | (2009.01) | |
| *H04W 40/00* | (2009.01) | |
| *H04W 40/02* | (2009.01) | |
| *H04M 7/12* | (2006.01) | |
| *H04Q 3/00* | (2006.01) | |
| *H04M 7/00* | (2006.01) | |
| *H04M 1/65* | (2006.01) | |

(52) U.S. Cl.
CPC ........... *H04M7/1235* (2013.01); *H04Q 3/0029* (2013.01); *H04M 7/0093* (2013.01); *H04M 1/651* (2013.01); *H04M 2250/60* (2013.01)
USPC ... 455/417; 455/426.1; 455/445; 379/211.02; 379/142.07

(56) References Cited

U.S. PATENT DOCUMENTS

| | | |
|---|---|---|
| 4,009,337 A | 2/1977 | Sakai et al. |
| 4,022,983 A | 5/1977 | Braun et al. |
| 4,485,470 A | 11/1984 | Reali |
| 4,736,405 A | 4/1988 | Akiyama |
| 4,809,321 A | 2/1989 | Morganstein et al. |
| 4,893,336 A | 1/1990 | Wuthnow |
| 4,994,926 A | 2/1991 | Gordon et al. |
| 5,040,208 A | 8/1991 | Jolissaint |
| 5,046,087 A | 9/1991 | Sakai |
| 5,291,302 A | 3/1994 | Gordon et al. |
| 5,361,295 A | 11/1994 | Solomon et al. |
| 5,384,831 A | 1/1995 | Creswell et al. |
| 5,404,537 A | 4/1995 | Olnowich et al. |
| 5,434,908 A | 7/1995 | Klein |
| 5,440,620 A | 8/1995 | Slusky |
| 5,459,584 A | 10/1995 | Gordon et al. |
| 5,467,388 A | 11/1995 | Redd, Jr. et al. |
| 5,526,524 A | 6/1996 | Madduri |
| 5,533,102 A | 7/1996 | Robinson et al. |
| 5,533,106 A | 7/1996 | Blumhardt |
| 5,548,636 A | 8/1996 | Bannister et al. |
| 5,577,111 A | 11/1996 | Iida et al. |
| 5,583,918 A | 12/1996 | Nakagawa |
| 5,619,557 A | 4/1997 | Van Berkum |
| 5,640,677 A | 6/1997 | Karlsson |
| 5,651,054 A | 7/1997 | Dunn et al. |
| 5,668,861 A | 9/1997 | Watts |
| 5,751,795 A | 5/1998 | Hassler et al. |
| 5,774,067 A | 6/1998 | Olnowich et al. |
| 5,805,587 A | 9/1998 | Norris et al. |
| 5,809,128 A | 9/1998 | McMullin |
| 5,812,551 A | 9/1998 | Tsukazoe et al. |
| 5,825,867 A | 10/1998 | Epler et al. |
| 5,832,060 A | 11/1998 | Corlett et al. |
| 5,835,573 A | 11/1998 | Dee et al. |
| 5,862,208 A | 1/1999 | MeLampy et al. |
| 5,894,504 A | 4/1999 | Alfred et al. |
| 5,912,948 A | 6/1999 | Nelson et al. |
| 5,946,386 A | 8/1999 | Rogers et al. |
| 5,960,064 A | 9/1999 | Foladare et al. |
| 5,960,073 A | 9/1999 | Kikinis et al. |
| 5,963,629 A | 10/1999 | Jung |
| 5,991,367 A | 11/1999 | Robuck |
| 5,995,594 A | 11/1999 | Shaffer et al. |
| 5,995,603 A | 11/1999 | Anderson |
| 5,999,806 A | 12/1999 | Kaplan et al. |
| 6,014,436 A | 1/2000 | Florence et al. |
| 6,023,503 A | 2/2000 | Schneider et al. |
| 6,031,896 A | 2/2000 | Gardell et al. |
| 6,032,051 A | 2/2000 | Hall et al. |
| 6,034,956 A | 3/2000 | Olnowich et al. |
| 6,035,031 A | 3/2000 | Silverman |
| 6,041,103 A | 3/2000 | La Porta et al. |
| 6,044,059 A | 3/2000 | Olnowich |
| 6,055,430 A | 4/2000 | Cooper et al. |
| 6,078,581 A | 6/2000 | Shtivelman et al. |
| 6,100,873 A | 8/2000 | Bayless et al. |
| 6,101,249 A | 8/2000 | Weber |
| 6,104,800 A | 8/2000 | Benson |
| 6,144,644 A | 11/2000 | Bajzath et al. |
| 6,160,881 A | 12/2000 | Beyda et al. |
| 6,167,127 A | 12/2000 | Smith et al. |
| 6,169,795 B1 | 1/2001 | Dunn et al. |
| 6,169,796 B1 | 1/2001 | Bauer et al. |
| 6,173,054 B1 | 1/2001 | Beyda et al. |
| 6,175,622 B1 | 1/2001 | Chiniwala et al. |
| 6,178,183 B1 | 1/2001 | Buskirk, Jr. |
| 6,181,691 B1 | 1/2001 | Markgraf et al. |
| 6,208,638 B1 | 3/2001 | Rieley et al. |
| 6,212,261 B1 | 4/2001 | Meubus et al. |
| 6,230,009 B1 | 5/2001 | Holmes et al. |
| 6,243,378 B1 | 6/2001 | Olnowich |
| 6,253,249 B1 | 6/2001 | Belzile |
| 6,278,704 B1 | 8/2001 | Creamer et al. |
| 6,292,478 B1 | 9/2001 | Farris |
| 6,304,565 B1 | 10/2001 | Ramamurthy |
| 6,310,939 B1 | 10/2001 | Varney |
| 6,337,898 B1 | 1/2002 | Gordon |
| 6,350,066 B1 | 2/2002 | Bobo, II |
| 6,353,660 B1 | 3/2002 | Burger et al. |
| 6,353,663 B1 | 3/2002 | Stevens et al. |
| 6,363,414 B1 | 3/2002 | Nicholls et al. |
| 6,374,102 B1 | 4/2002 | Brachman et al. |
| 6,381,459 B1 | 4/2002 | Gervens et al. |
| 6,405,035 B1 | 6/2002 | Singh |
| 6,411,601 B1 | 6/2002 | Shaffer et al. |
| 6,411,692 B1 | 6/2002 | Scherer |
| 6,411,805 B1 | 6/2002 | Becker et al. |
| 6,438,216 B1 | 8/2002 | Aktas |
| 6,438,222 B1 | 8/2002 | Burg |
| 6,477,246 B1 | 11/2002 | Dolan et al. |
| 6,496,569 B2 | 12/2002 | Pelletier et al. |
| 6,496,576 B2 | 12/2002 | Tanaka et al. |
| 6,501,750 B1 | 12/2002 | Shaffer et al. |
| 6,505,163 B1 | 1/2003 | Zhang et al. |
| 6,510,162 B1 | 1/2003 | Fijolek et al. |
| 6,510,417 B1 | 1/2003 | Woods et al. |
| 6,512,930 B2 | 1/2003 | Sandegren |
| 6,519,258 B1 | 2/2003 | Tsukazoe et al. |
| 6,529,587 B1 | 3/2003 | Cannon et al. |
| 6,539,084 B1 | 3/2003 | Long |
| 6,545,589 B1 | 4/2003 | Fuller et al. |
| 6,546,087 B2 | 4/2003 | Shaffer et al. |
| 6,549,612 B2 | 4/2003 | Gifford et al. |
| 6,553,222 B1 | 4/2003 | Weiss |
| 6,564,264 B1 | 5/2003 | Creswell et al. |
| 6,564,321 B2 | 5/2003 | Bobo, II |
| 6,567,505 B1 | 5/2003 | Omori et al. |
| 6,574,319 B2 | 6/2003 | Latter et al. |
| 6,621,892 B1 | 9/2003 | Banister et al. |
| 6,643,034 B1 | 11/2003 | Gordon et al. |
| 6,658,100 B1 | 12/2003 | Lund |
| 6,661,785 B1 | 12/2003 | Zhang et al. |
| 6,661,886 B1 | 12/2003 | Huart et al. |
| 6,662,232 B1 | 12/2003 | Nicholls et al. |
| 6,690,785 B1 | 2/2004 | Stelter et al. |
| 6,751,299 B1 | 6/2004 | Brown et al. |
| 6,775,370 B2 | 8/2004 | Burg |
| 6,782,088 B1 | 8/2004 | Gabara |
| 6,785,021 B1 | 8/2004 | Gordon et al. |
| 6,792,094 B1 | 9/2004 | Kirkpatrick |
| 6,829,332 B2 | 12/2004 | Farris et al. |
| 6,857,074 B2 | 2/2005 | Bobo, II |
| 6,898,275 B2 | 5/2005 | Dolan et al. |
| 6,968,174 B1 | 11/2005 | Trandal et al. |
| 7,003,087 B2 | 2/2006 | Spencer et al. |
| 7,120,455 B1 | 10/2006 | Chen et al. |

(56) References Cited

U.S. PATENT DOCUMENTS

| | | |
|---|---|---|
| 7,209,964 B2 | 4/2007 | Dugan et al. |
| 7,254,219 B1 | 8/2007 | Hansen et al. |
| 7,382,773 B2 | 6/2008 | Schoeneberger et al. |
| 7,388,949 B2 | 6/2008 | Contractor et al. |
| 7,412,050 B2 | 8/2008 | Renner et al. |
| 7,522,580 B2 | 4/2009 | Miller et al. |
| 7,548,756 B2 | 6/2009 | Velthuis et al. |
| 7,688,958 B2 | 3/2010 | Dolan et al. |
| 2002/0010616 A1 | 1/2002 | Itzhaki |
| 2002/0035616 A1 | 3/2002 | Diamond et al. |
| 2002/0097710 A1 | 7/2002 | Burg |
| 2003/0039339 A1 | 2/2003 | Luehrig et al. |
| 2003/0063731 A1 | 4/2003 | Woodring |
| 2003/0123629 A1 | 7/2003 | Hussain et al. |
| 2003/0156700 A1 | 8/2003 | Brown et al. |
| 2003/0191823 A1 | 10/2003 | Bansal et al. |
| 2003/0215078 A1 | 11/2003 | Brahm et al. |
| 2004/0028203 A1 | 2/2004 | Wurster et al. |
| 2004/0066926 A1 | 4/2004 | Brockbank et al. |
| 2004/0073566 A1 | 4/2004 | Trivedi |
| 2004/0105536 A1 | 6/2004 | Williams |
| 2004/0174983 A1 | 9/2004 | Olschwang et al. |
| 2004/0190706 A1 | 9/2004 | Fleischer, III et al. |
| 2004/0247105 A1 | 12/2004 | Mullis et al. |
| 2004/0249650 A1 | 12/2004 | Freedman et al. |
| 2004/0258220 A1 | 12/2004 | Levine et al. |
| 2005/0010573 A1 | 1/2005 | Garg |
| 2005/0053216 A1 | 3/2005 | Spencer et al. |
| 2005/0078612 A1 | 4/2005 | Lang |
| 2005/0117726 A1 | 6/2005 | DeMent et al. |
| 2005/0123118 A1 | 6/2005 | Terry et al. |
| 2005/0154599 A1 | 7/2005 | Kopra et al. |
| 2005/0186950 A1 | 8/2005 | Jiang |
| 2005/0201362 A1 | 9/2005 | Klein et al. |
| 2005/0207556 A1 | 9/2005 | Gonzalez et al. |
| 2005/0265322 A1 | 12/2005 | Hester |
| 2005/0286498 A1 | 12/2005 | Rand et al. |
| 2005/0287993 A1 | 12/2005 | Gogic |
| 2006/0013374 A1 | 1/2006 | Fleischer, III et al. |
| 2006/0268007 A1 | 11/2006 | Gopalakrishnan |
| 2006/0276193 A1 | 12/2006 | Itzkovitz et al. |
| 2007/0002077 A1 | 1/2007 | Gopalakrishnan |
| 2007/0067738 A1 | 3/2007 | Flynt et al. |
| 2007/0153999 A1 | 7/2007 | Daigle |
| 2007/0160188 A1 | 7/2007 | Sharpe et al. |
| 2007/0202898 A1 | 8/2007 | Bae et al. |
| 2009/0100027 A1 | 4/2009 | Malik |
| 2010/0008356 A1 | 1/2010 | Boni et al. |

FOREIGN PATENT DOCUMENTS

| | | |
|---|---|---|
| JP | 10-513632 | 12/1998 |
| JP | 11-506292 | 6/1999 |
| JP | 2001-168989 | 6/2001 |
| WO | WO 97/26749 | 7/1997 |
| WO | WO 00/60840 | 10/2000 |
| WO | WO 01/76210 | 10/2001 |

OTHER PUBLICATIONS

"Widget MySpace Widget"; posted by 4INFO Bob; http://4info.typepad.com/blog/2006/09/widget_myspace_.html; Sep. 15, 2006; 3 pages.

Communications—SMS, Dashboard Widgets—Showcase; http://www.dashboardwidgets.com/showcase/details.php?wid=1082; Oct. 14, 2005; 2 pages.

METHODS AND SYSTEMS FOR CALL PROCESSING IN A WIRELINE AND WIRELESS NETWORK

CROSS-REFERENCE TO RELATED APPLICATIONS

This application is a continuation of U.S. application Ser. No. 13/798,963, filed Mar. 13, 2013, a continuation of U.S. application Ser. No. 13/450,113, filed Apr. 18, 2012, now U.S. Pat. No. 8,401,533, which is a continuation of U.S. application Ser. No. 11/676,479, filed Feb. 19, 2007, now U.S. Pat. No. 8,165,572, which claims priority from U.S. Patent Application No. 60/775,601, filed Feb. 22, 2006, the contents of which are incorporated herein by reference in their entirety.

STATEMENT REGARDING FEDERALLY SPONSORED R&D

Not applicable.

PARTIES OF JOINT RESEARCH AGREEMENT

Not applicable.

REFERENCE TO SEQUENCE LISTING, TABLE, OR COMPUTER PROGRAM LISTING

Not applicable.

BACKGROUND OF THE INVENTION

1. Field of the Invention

The present invention is related to telecommunications, and in particular, to methods and systems for call processing.

2. Description of the Related Art

People are increasingly associated with a multiplicity of communication devices and phone numbers. For example, an individual may have a work phone, a home phone connected to a switched telephone network, a phone connected to an Internet protocol network, and a cellular phone.

In addition, mobile virtual network operators have become increasingly common as niche target consumers are identified that can be better addressed with offerings more focused on their needs. The existence of mobile virtual network operators can add additional complexity to the operation of a telecommunications system.

SUMMARY OF THE INVENTION

The present invention is related to telecommunications, and in particular, to methods and systems for call processing.

Certain example embodiments provide integrated wireline and wireless call processing. Further, certain embodiments integrate the contributions of wireless, wireline, and mobile virtual network operators (MVNOs). In an example embodiment, a communications service provider and a wireline carrier optionally integrate with a wireless MVNO to provide certain call processing services.

An example embodiment provides a method of routing calls: receiving at a softswitch a call from a first phone address intended for a user associated with a second phone address; using signaling information associated with the call to access account information for the user; determining if a client application associated with the user is online; if the client application is online, transmitting information over a data network regarding the call to the client application while the call is in progress; placing an outbound call from the call processing system to a wireless communications service provider, wherein the call processing system configures call signaling parameters so as to preserve the first phone address in the outbound call signaling information, and so that the outbound call appears to be to a phone address ported to the wireless communication service provider, and to cause, at least in part, the wireless communication service provider to route the outbound call to the user's mobile telecommunications device; and causing at least in part the outbound call to be bridged with the call intended for the user.

An example embodiment provides a method of routing calls: receiving at a softswitch a call intended for a user, the call associated with a calling party phone address; using signaling information associated with the call to access account information for the user; placing an outbound call from the call processing system to a wireless communications service provider associated with a user phone address, wherein the call processing system configures call signaling parameters so as to preserve the calling party phone address in the outbound call signaling information, wherein the outbound call appears to be to a phone address ported to the wireless communication service provider, and to cause, at least in part, the wireless communication service provider to route the outbound call to the user's mobile telecommunications device; and causing at least in part the outbound call to be bridged with the inbound call.

An example embodiment provides a method of routing calls: receiving at a softswitch a call from a calling phone address intended for a user; using signaling information associated with the call to access account information for the user; determining if a client application associated with the user is online; if the client application is online, transmitting information over a data network regarding the call to the client application while the call is in progress; placing a first outbound call from the call processing system to a wireless communications service provider wherein the call processing system configures call signaling parameters so as to preserve the calling party phone address, wherein the outbound call appears to be to a phone address ported to the wireless communication service provider, and to cause, at least in part, the wireless communication service provider to route the first outbound call to the user's mobile telecommunications device; placing a second outbound call from the call processing system to a phone address associated with the user; and causing at least in part an outbound call to be bridged with the call.

An example embodiment provides a method of routing calls, the method comprising: receiving at a softswitch a call intended for a user; using signaling information associated with the call to access account information for the user; determining if a client application associated with the user is online; if the client application is online, transmitting information over a data network regarding the call to the client application while the call is in progress; receiving a call handling instruction from the user via the telecommunications client application regarding the call; placing a first outbound call from the call processing system to a wireless communications service provider wherein the call processing system configures call signaling parameters associated with the outbound call so as to preserve the calling party phone address and to cause, at least in part, the wireless communication service provider to route the first outbound call to the user's mobile telecommunications device; and causing at least in part the outbound call to be bridged with the call.

DETAILED DESCRIPTION OF THE PREFERRED EMBODIMENT

Figure 1:
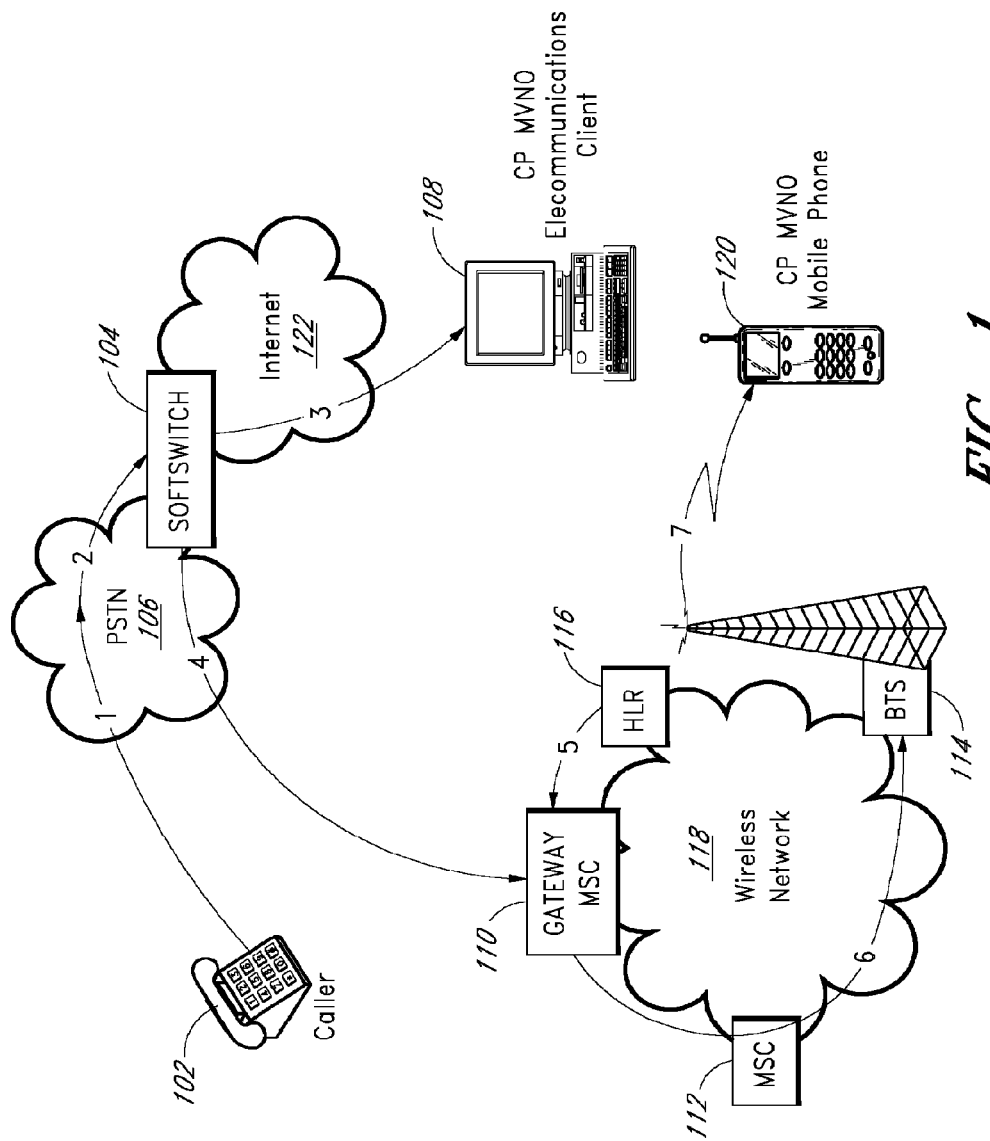
FIG. 1 illustrates an example system and process for providing converged telecommunication services.

As discussed above, people are increasingly associated with a multiplicity of communication devices, such as a work phone, a home phone connected to a switched telephone network, a phone connected to an Internet protocol network, a cellular phone, etc. Thus, it is often difficult for a caller wishing to reach a person to decide which of the many phone numbers associated with the person to call. For example, a caller may first try a work phone, and if the person is not there or does not answer, the caller may then call the person's home phone, then the person's mobile phone, etc. It would be advantageous to have a phone address, such as a single phone number, which can be used to reach a person whether the person is at a landline phone, mobile phone, or a VoIP phone.

There are challenges in routing calls seamlessly across wireline and wireless networks. As described herein, certain example embodiments provide integrated wireline and wireless call processing that is seamless to the subscriber. Further, certain embodiments integrate the contributions of wireless, wireline, and mobile virtual network operators (MVNOs). For example, an MVNO may not own a licensed frequency spectrum, but instead resells wireless telecommunications services under the MVNO's brand name using a mobile phone network of another (e.g., a mobile phone network operator which may provide mobile phone services on a wholesale and/or retail level, which will sometimes be referred to herein as the "underlying wireless service provider").

While the following description refers to example Web page, network and telephony standards and protocols, other standards and protocols can be used as well. In addition, unless otherwise indicated, the functions described herein may be performed by executable code and instructions stored in computer readable memory and running on one or more processor-based systems. However, state machines, and/or hardwired electronic circuits can also be utilized. Further, with respect to the example processes described herein, not all the process states need to be reached, nor do the states have to be performed in the illustrated order. Further, certain process states that are illustrated as being serially performed can be performed in parallel.

Similarly, while certain examples may refer to a personal computer system, other computer or electronic systems can be used as well, such as, without limitation, an interactive television, a networked-enabled personal digital assistant (PDA), a networked game console, a networked entertainment device, and so on. While certain references are made to certain system components or services, other components and services can be used as well. In addition, while certain user inputs are described as being provided via key presses or by clicking on a button, optionally, user inputs can be provides using other techniques, such as by voice or otherwise. While certain phone numbers are referenced for purposes of illustration, other phone numbers or electronic addresses or locators can be used as well.

Unless otherwise specified, the term phone number refers generally to a telephonic address, such as, without limitation, a standard POTs telephone number, an E.164 phone number (ITU-T recommendation which defines the international public telecommunication numbering plan and telephone format used in the PSTN and certain data networks), or a VoIP address.

The following is a glossary of certain abbreviations.

GLOSSARY

BTS—Base Transceiver Station
CP MVNO—Carrier Partner MVNO
FCI—Forward Call Indicator
HLR—Home Location Register
ISDN—Integrated Services Digital Network
ISUP—ISDN User Part
LERG—Local Exchange Routing Guide
LNP—Local Number Portability
LRN—Location Routing Number
MDN—Mobile Device Number
MSC—Mobile Switching Center
MVNO—Mobile Virtual Network Operator
PSTN—Public Switched Telephone Network
SIP—Session Initiation Protocol
SMS—Short Message Service
SMSC—Short Message Service Center
TCNI—Translated Called Number Indicator In an example embodiment, a communications service provider (e.g., offering enhanced telecommunication services) and a wireline carrier optionally integrate with a wireless MVNO to provide certain call processing services, such as a mobile one-number service. In this example embodiment, phone numbers owned/controlled by the wireline carrier are utilized as the Mobile Device Numbers (MDN) (sometimes referred to as a Mobile Directory Number) for the MVNO's wireless, mobile phones. Calls to these MDNs route through a call processing system (also referred to herein as a softswitch) associated with the communications service provider, which in turn routes the calls to the wireless MVNO. The softswitch optionally also communicates with a telecommunications client associated with a subscriber or other user.

The telecommunications client application is used to provide communication services, although such interfaces can be provided using other applications, such as a browser accessing call processing user interfaces and information from a remote server. In an example embodiment, the telecommunications client application connects to and communicates with the softswitch via the Internet, a cable network, or other communication medium. The client application, executing on a subscriber's computer terminal, can make the subscriber's online presence known to the softswitch (e.g., by transmitting a message from the client application host to the softswitch).

The softswitch can be used to receive and display call log data from the softswitch (e.g., a list of calls placed to/received by the subscriber, or placed by the subscriber, including phone numbers, caller or called party names, date/time of the call, an indication as to whether a call was an outbound/inbound call, the city/state of the caller/called party, etc.), and call alert data (e.g., listing the caller phone number, name, city/state, and/or call status (e.g., ringing, playing message, recording caller message, terminating call)). The client application can display a log of recorded messages from callers, and can provide playback controls for playing back the recorded message via the client computer terminal. The client optionally can also be used to screen calls in substantially real time while calls are in progress and to instruct the softswitch to accept calls on the host computer terminal, forward calls, refuse calls, initiate call conferencing, and/or to otherwise provide call handling instructions.

Figure 2:
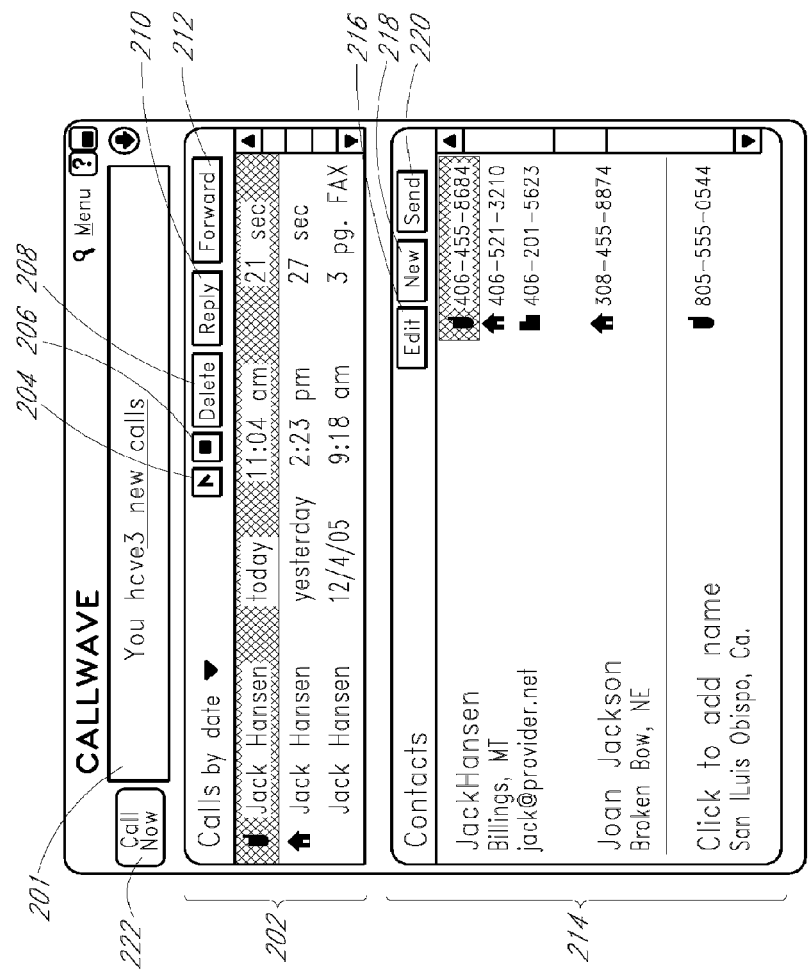
FIG. 2 illustrates an example telecommunications client user interface.

An example telecommunications client providing a call log 202 and a contacts user interface 214 is shown in FIG. 2. In this example, a first area 201, informs the user how many new calls the user has received. The call log 202 in this example includes the name of the caller (if available) as obtained using call signaling information (e.g., callerID) or otherwise, the date of the call (e.g., "today", "yesterday", or the date including the month, day, and year), the time of the call, and the length of the message left by the caller (e.g., the message length in seconds/minutes, or a no message indication if no message was left). In addition, if the call was a fax, the log can so indicate, and further indicate the length of the fax (e.g., in pages), and the time and date of the fax call. Less, more, and/or different information can be provided and displayed as well.

Figure 3:
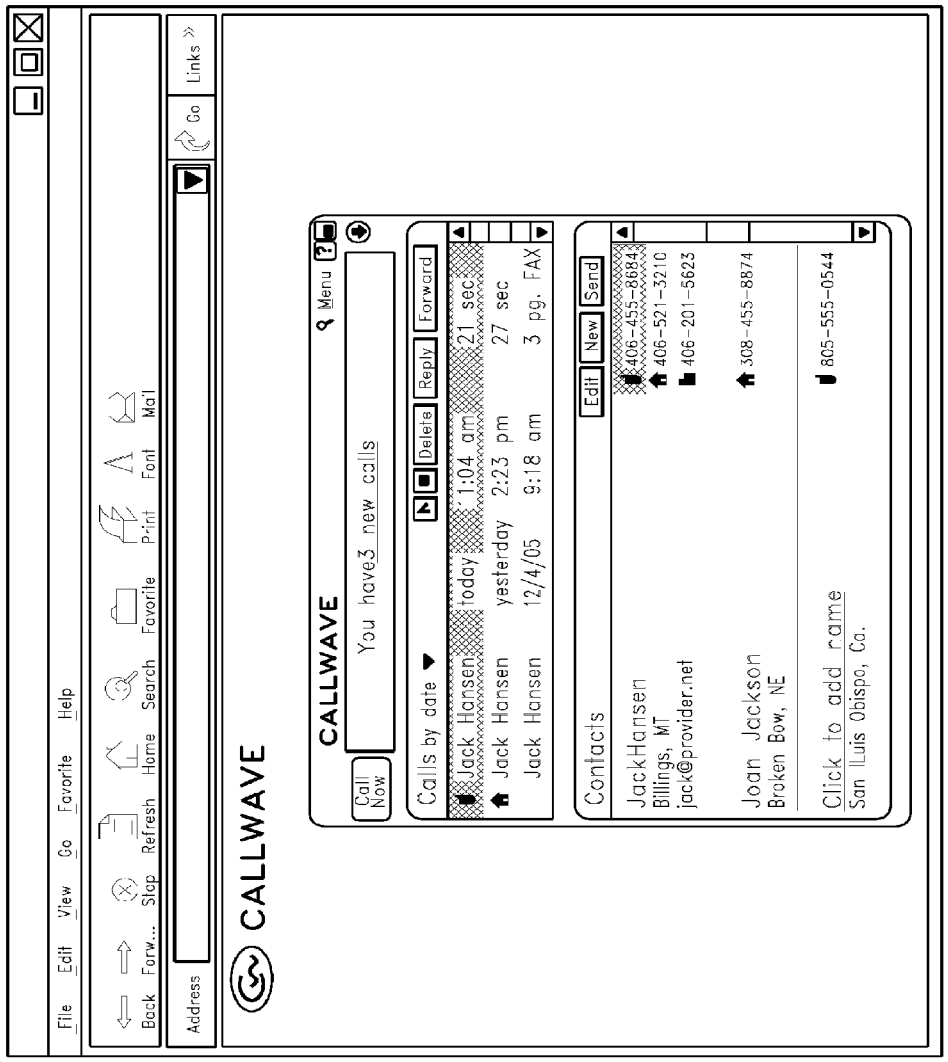
FIG. 3 illustrates an example browser-based telecommunications client user interface.

A play caller message control 204 (which when activated by the user causes a caller message to be played back on the host) and a stop/pause message playback control 206 are optionally provided. In addition, optionally, a delete log entry control 208, a reply to caller (e.g., via a text or multimedia message) control 210, and/or a forward caller message (and/or log entry) control 212 are provided. The contact user interface can list one or more contacts of the user (e.g., including some or all of the following: contact name; contact location, contact email address, one or more contact phone addresses, a designation for one or more of the phone addresses indicated if the phone address is a mobile phone address, a home phone address, a work phone address, an IP phone address, or a fax phone address). An edit contact record control 216, a create new contact record control 218, and a send contact record control 220 are optionally provided. Examples of certain of such controls are described below. A second example telecommunication client, with call log and contacts accessed and displayed via a Web browser, is illustrated in FIG. 3.

Clicking on or otherwise moving a cursor to a call entry in an example call log selects the call, and then applicable button controls then apply to that call. Optionally, the first time the call log is displayed in a given session, the first (most recent) call is selected by default. Optionally, when switching between call log and contacts user interfaces, the previously selected call is remembered and redisplayed when the call log is again selected.

If a message (e.g., a recorded message from a caller) is associated with the call, the message can be played by clicking on a Play button (e.g., control 204). While a call is playing, optionally a sliding cursor shows play progress. Playing can be stopped at a desired point by clicking a stop/pause button (e.g., control 206), or a play cursor can be repositioned to restart play at another point. Optionally, call volume can be adjusted via a client application call control and/or via a separate operating system or other volume control.

A Delete control (e.g., delete control 208) is provided, which, when activated, causes the deletion of a call log entry. An Undo control is optionally provided, which, when activated can undelete previously deleted calls (e.g., up to a certain limit, such as the last 10 deleted calls).

A Forward control (e.g., control 212) is optionally provided, which, when activated causes information regarding the currently selected call to be forwarded to a designated recipient (e.g., via email, SMS, MMS, instant messaging, etc.). Activating the Forward control optionally causes a drop down list of the user's contacts, or a portion thereof, to be displayed. Optionally, the user contacts are listed alphabetically by name, and optionally contact entries without a name are excluded or listed after those entries with a name.

A Reply control (e.g., control 210) is optionally provided, which, when activated causes, by way of example, a text message field and/or a multimedia message field to be presented to the user into which the user can enter a reply message (e.g., text or multimedia). The message address field will optionally be pre-populated with the name/address of a selected call log entry. Optionally, if the reply is to a cell phone message, the default prepopulated address field can be the caller's SMS or MMS address. Optionally, the address field can be overwritten by the sender or an email address stored in the caller's contact record can be used.

A Send control is optionally provided, which, when activated causes, by way of example, a text message field to be presented to the user into which the user can enter a text or multimedia message. The message address field can be pre-populated with the name/address of a selected call log entry or contact.

An Invite button control provided is provided (optionally, when the contact has not yet been sent an email or other electronic invitation via the softswitch to try certain services (e.g., TYF email or other electronic communication) to the given address (e.g., email address) or if the address is blank; if an invitation had previously been sent, a Reinvite control is optionally provided. Optionally, users who click on or otherwise activate the Invite button control for a blank email address are asked to enter an email address first; otherwise, both Invite and Reinvite display a TYF form with this entry's email address pre-populated.

The user's call log is optionally stored on the user's computer and is available when the application client is offline. As similarly discussed elsewhere herein, the call log stored on the user's computer is synchronized with the softswitch when the telecommunications client logs in to the softswitch, and synchronization is optionally periodically performed while online (e.g., every minute, every two minutes, or at other interval) while the client is online.

Optionally, when an incoming call is received, the telecommunications client is automatically maximized or increased in size if it is currently minimized, the information about the caller (e.g., name, phone number, and/or city/state) is displayed, and the message being left by the caller is played, unless the speaker mute control is activated, as discussed below. When the call completes, the call is optionally displayed as the first call in the call log and it is highlighted or otherwise emphasized (e.g., via a new call icon) to indicate it is a new call. Optionally, an indication is provided (e.g., via a blinking icon) that new calls have been received until the indicator is clicked on or the new calls in the call log are clicked.

If incoming calls are received by the softswitch when a telecommunications client is offline, when the telecommunications client goes online and a session is established with the softswitch, information related to those incoming calls is transmitted by the softswitch to the client. The call information for the calls is optionally displayed at the top of the call log (or at another designated position) with highlighting or other indicator that indicates the calls are new calls, and optionally, an icon is blinked or otherwise emphasized to indicate that new calls have been received.

Optionally, the telecommunications client has a user accessible control (e.g., with a speaker icon) for muting telecommunications sound signals that would otherwise be produced by the host computer speaker. When clicked on or depressed, sound from the client application to the speaker is muted, and when not depressed or when clicked on again, the sound is unmuted. Optionally, the user can control the default state/position of the mute control for incoming calls (e.g., via the option setting "Enable speaker during incoming calls"). Optionally, by default the client application sound to the speaker is not muted for incoming calls. If the user clicks on a message entry in a call log to play the message (or otherwise activates a play message control), optionally the mute control automatically changes to the unmuted position/state, and again changes to its specified default position/state if an incoming call is received. The mute control can be clicked while playing a message or receiving a call to change the speaker/mute behavior.

Figure 4A:
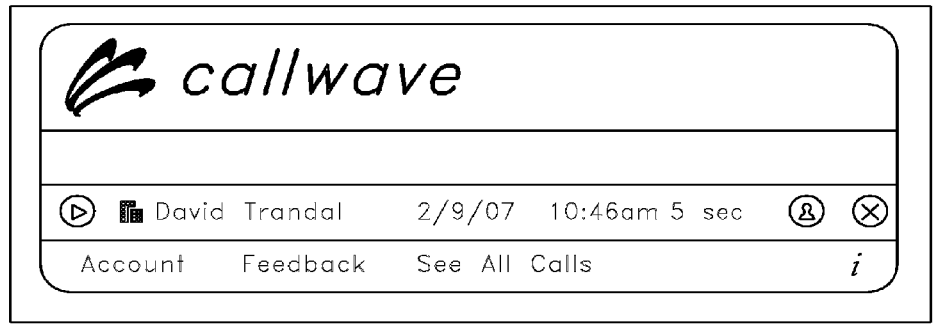
FIGS. 4A-B illustrates an example web widget-based telecommunications client.
Figure 4B:
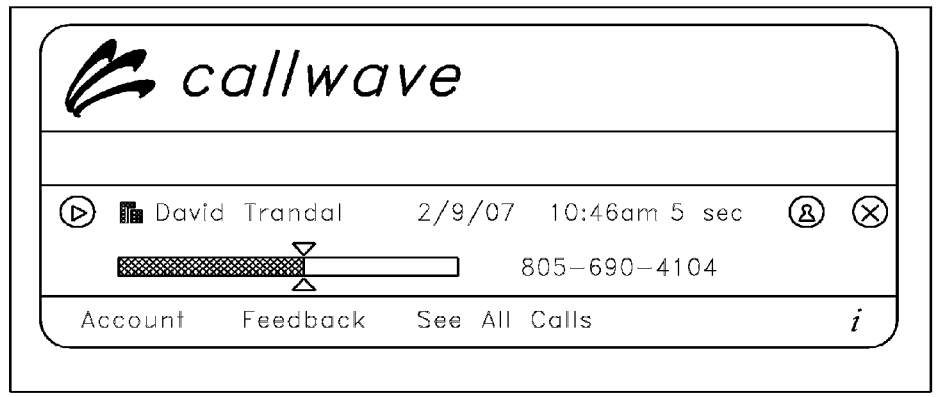

FIGS. 4A-B illustrate example telecommunications user interfaces provided via a widget or gadget that can provide some or all of the functionality described above with respect to FIG. 2. A widget can be in the form of a portable code that can be installed and executed within a Web page (e.g., an HTML-based web page) by an end user without requiring additional compilation. By way of illustration, a widget can be in the form of a window (with or without a border) with a particular appearance and behavior, a text box, a media player, etc. A widget can optionally accept and process user inputs. A gadget is equivalent to a widget that works in a Google framework. Other types of applications can be used as well to provide the functionality of a widget or gadget.

FIG. 4A illustrates the example widget user interface displaying call information for the most recent received call. The user interface includes the name/identifier (if available) of the caller, the date of the call, the time of the call, and the connect time, length of message left (if any), or length of fax received (if any). An expand control is provided to expand the size and/or amount of information displayed. An account control is provided, which when activated causes an account management Web page to be presented. A feedback control is provided which, when activated, causes a form to be presented via which the user can submit feedback to the system operator/provider (e.g., like and dislikes regarding the system and services, problem issues, etc.), access a help interface, and/or access answers to frequently asked questions. A "see all calls" control is provided, which when activated, causes the user interface to list numerous past calls (e.g., all past calls, all past call received in a certain time period whose entries have not been deleted, a certain number of past calls, etc.), optionally in a scrollable user interface.

FIG. 4B illustrates an example expanded version of the user interface illustrated in FIG. 4A. The example view displays the calling number (if available) and a message playback status bar.

In an example embodiment, a "one-number" communication process is used, wherein a user is assigned a phone address (e.g., a phone number) that externally identifies one or more telecommunication devices (e.g., a wireless telephone), and can be used as follows:

The "one-number" is the number the customer publishes for people to call the telecommunication device (e.g., a telephone) or send messages (e.g., SMS text messages or MMS messages) to the "one-number".

The "one-number" is the number that is published as the caller ID when the customer makes calls with the phone or sends SMS/MMS messages.

Optionally, calls to this "one-number" are routed through the softswitch on their way to the phone to provide enhanced call management services.

In an example illustrative embodiment, the CP MVNO allocates phone numbers for its mobile phones from its own number pool. Calls to numbers in this pool will route through the PSTN and terminate on the softswitch because it would own the assigned point code (node address). Optionally, the CP MVNO provisions one or more phone number blocks as wireless (e.g., coded as NXXTYPE=51, which indicates that the NXX (the 3 digits after the area code in the United States) is shared between wireless and POTs). This phone address provisioning step may simplify SMS routing for wireless carriers that rely upon this wireless designation in routing databases (e.g., the LERG). Certain example embodiments include a call processing system softswitch that configures call signaling parameters associated with an outbound call so that the outbound call appears to be to a phone number ported to a wireless communication service provider, even though the phone number has not been ported to the wireless communication service provider.

In an example embodiment, the CP MVNO contracts with an inter-carrier SMS gateway to broadcast the CP MVNO number blocks to other inter-carrier SMS gateway providers and to route SMS messages addressed to the numbers in the block to the underlying wireless service provider's SMSC. Otherwise, in certain telecommunication systems, because the phone number appears to be landline phone number, if a pool of landline phone numbers are used, an SMS message would pass to the gateway MSC provider associated with the landline phone number, which would discard it (e.g., because the SMS message is not deliverable to a landline phone) or otherwise fail to deliver the SMS message.

In an example embodiment, when provisioning service for a CP MVNO mobile phone, the phone numbers that are offered to the customer to choose from come from the CP MVNO number pool. Optionally, the underlying wireless service provider assigns the chosen phone number as the phone's MDN and disables or inhibits optimal routing for the phone, as discussed below.

In this example, the underlying wireless service provider MSC and SMSC are configured to accept/route calls and SMS messages directed to MDN's of mobile phones it is servicing, even though these MDN's are not owned (from a call routing database (e.g., LERG) perspective) by the underlying wireless service provider.

CallWave, Inc. is an example of an enhanced service provider providing integrated wireline and wireless enhanced call processing. Sprint Wireless, Verizon, Cingular are examples of wireless phone operators currently providing wholesale Mobile Virtual Network Operator services. Of course, other providers can be used instead or in addition.

FIG. 1 depicts an example call scenario in which a caller 102 initiates a call to a CP MVNO mobile phone, where the call is routed to a MVNO mobile phone 120 associated with the called party (e.g., a customer of the enhanced telecommunications service provider, MVNO, landline telecommunications provider) via a softswitch 104. An example call handling sequence is as follows:

State 1. A caller associated with a telecommunications device 102 dials the phone number of the CP MVNO mobile phone 120.

State 2. The PSTN system compares the phone number with a database of phone numbers that indicates the "ownership" of the phone number. The phone number is recognized in the PSTN 106 as "owned" by the CP MVNO with a point code assigned to the softswitch 104. The PSTN 106 routes the call to the softswitch 104, which then receives the call.

State 3. In this example, the softswitch 104 utilizes signaling information associated with the call (e.g., the called phone number) to identify the customer being called, accesses account information associated with the customer using the called phone number, utilizes the account information to identify address information associated with the customer's telecommunications client 108, and determines that the customer's telecommunications client 108 (e.g., CP MVNO-branded telecommunications client hosted on a personal computer, networked television, smart phone, etc.) is online (e.g., from a message sent by the client to the softswitch).

The softswitch 104 transmits over the Internet 122 (or other network) to the telecommunications client 108 a notification regarding the call (optionally including the name, phone number, city and/or state of the caller), and the client 108 provides the customer with some or all of the received call information (e.g., initiates or otherwise provides a ringing sound indicating the existence of an inbound call and/or displays call information/status, such as the number/identity of the caller, the geographical (city, state) location from which the call originated, etc.). This gives the customer the opportunity to screen the call (e.g., via the caller information associated with the call or via a message being left by the caller on a voice answering system, which may be include in the softswitch, and streamed to the customer's terminal in substantially real time so the customer can decide whether or not to take the call), take the call on the telecommunication application client host, and/or transfer the call to another phone (e.g., a mobile phone, a landline phone, a broadband phone, a VoIP phone, etc.

By way of example, the client application 108 can provide a "take the call" control (e.g., via a soft button or link), which when activated by the customer, causes the call to be connected to the client host (e.g., using VoIP where the host is equipped with VoIP software, microphone, speaker) so that the customer and caller can converse. By way of further example, the client application 108 can provide a "forward the call" control, which when activated by the customer, causes a listing of predefined destinations to be presented and/or a phone address field in which the customer can enter a destination phone address. The customer can select a destination or enter a phone address, and the call is forwarded to the new destination (e.g., the softswitch 104 places an outcall to the new destination and bridged the inbound call from the caller with the outcall).

State 4. The softswitch routes the call (e.g., by placing an outcall) to a Gateway MSC 110 (Mobile Switching Center) that optionally is operated and/or owned by an underlying wireless service provider (e.g., that provides a wireless network and wireless cellular services compatible with one or more standards, such as CDMA, GSM, HSDPA, HSUPA, etc.) to the MVNO. In this example, the softswitch causes the call to be routed to the MSC 110 via the SS7 ISUP (ISDN User Part) Initial Address Message used to originate the call by: a) setting the Generic Address parameter to the called party number, b) setting the Called Party Number parameter to the LRN (Location Routing Number) of the underlying wireless service provider Gateway MSC (Mobile Switching Center), and c) setting the Translated Called Number Indicator (TCNI) bit in the Forward Call Parameter. Other routing techniques can be used as well.

State 5. The Gateway MSC 110 queries it's HLR 116 with the called party phone number. In this example, the HLR 116 stores and locates a match on the MDN of the CP MVNO mobile phone 120, and the query returns the phone's presence/location and the MSC that is currently serving the phone 120.

State 6. The Gateway MSC 110 routes the call to the serving MSC 112, which routes it to the appropriate BTS (Base Transceiver Station) 114.

State 7. The BTS 114 transmits an indication regarding the incoming call to the mobile phone 120, and in response, the mobile phone 120 rings and is answered by the customer. The answer state status is provided to the softswitch 104. When the softswitch 104 detects the answer state, it begins screening the call to the mobile phone (e.g., transmitting caller identification information and/or transmitting in substantially real time a message being left by the caller (e.g., in response to a "leave message" request played by the softswitch 104 to the caller) to the mobile phone while optionally preventing or not enabling the caller to hear the called party). The mobile phone user can then press 1 on the mobile phone 120 to take the call or 2 to transfer the call. Other user inputs can be used as well (e.g., voice commands, different key presses, etc.). If a take the call instruction is received, the softswitch can bridge the original call and the outcall in full duplex mode. Alternatively or in addition, the telecommunications user can take action on the call (e.g., take the call, forward the call, etc.).

Optionally, the Gateway MSC 110 is configured so that if the mobile phone had been turned off, was out of range, was busy, or was otherwise unavailable, the Gateway MSC 110 would have followed the forwarding rules configured in the HLR 116. For example, the forwarding rules can be configured to call the softswitch 104. The softswitch 104, configured to detect loopbacks and to take a message or attempt to deliver calls to another destination which such a loopback condition occurs, would detect this loopback situation and would act appropriately to take a message or attempt to deliver the call to a different phone used by the customer, as configured in a customer account database (e.g., where the customer specifies the telecommunication device order in which the softswitch should attempt to reach the customer if a higher ranked device is unavailable and/or not answered).

In this example, "optimal routing" (which, when a mobile phone is not in its home system, allows a call to be routed directly from the originating switch to the MSC currently serving the mobile phone, replacing the leg from the originating switch to the home MSC and the leg from the home MSC to the Serving MSC) in the HLR 116, would be disabled for the CP MVNO mobile phone 120. Thus, if a mobile phone being served by the underlying wireless service provider originates a call, the call will still route through PSTN 106 to the softswitch 104.

If the CP MVNO mobile phone 120 originates a call, the call is routed via standard or other wireless process, optionally without passing through the softswitch 104 unless the call is to another CP MVNO mobile phone.

In an example embodiment, for proper routing of SMS messages, the CP MVNO contracts with or otherwise arranges with an inter-carrier SMS gateway vendor to service the CP MVNO's block of mobile phone numbers. The SMS gateway is configured to route SMS messages addressed to phone numbers in the block to the underlying wireless service provider SMSC (Short Message Service Center). An SMS message sent by the CP MVNO mobile phone would have the phone's MDN in the HLR as the sending address signaled to the device receiving the message. If the address is not marked as private, the number, may be displayed via the receiving device (e.g., via a Caller ID display).

If the MDN assigned to a CP MVNO mobile phone had been ported to the CP MVNO, routing of calls and SMS messages still works properly. In the case of a call to the mobile phone, the LNP (Local Number Portability) dip is performed in the PSTN to cause the call to be routed to the softswitch. After that, the softswitch's routing to the wireless network is the same as or substantially similar to the above described scenario. Similarly for SMS messages, the inter-carrier SMS gateways perform an LNP dip to get the LRN identifying the owner of the addressed phone number. This LRN is recognized by the gateway as being associated with the CP MVNO's number block, which is designated to route to the underlying wireless service provider SMSC.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated.

What is claimed is:

1. A system, comprising:
   a data network interface;
   a telecommunications interface;
   a call processing system, including at least one processing device, coupled to the data network interface and the telecommunications interface, the call processing system configured to perform operations, comprising:
      receiving a first call, intended for a user, from a first calling party, the first call directed to a first phone address, wherein the first call is associated with a calling party phone address;
      placing an outbound call via a wireless network of a wireless communications service provider the user is subscribed to, wherein call signaling parameters of the outbound call are configured to preserve the calling party phone address;
      causing, at least in part, one or more subsequent calls from a mobile device of the user to be presented to one or more called parties with the first phone address;
      receiving a second call intended for the user from a second calling party, the second call directed to the first phone address; and
      causing, at least in part, routing to be configured within the wireless network so as to inhibit the second call from being routed directly to the mobile device of the user without transit through the call processing system even if both the user and the second calling party are subscribers of the wireless communications service provider.

2. The system as defined in claim 1, wherein the first phone address is not a phone number of the wireless communications service provider.

3. The system as defined in claim 1, wherein the first phone address has not been ported to the wireless communications service provider.

4. The system as defined in claim 1, wherein placing the outbound call to the wireless network comprises placing the outbound call to a mobile switching center associated with the wireless communications service provider via an SS7 ISUP (Signaling System 7 Integrated Services Digital Network User Part) Initial Address Message.

5. The system as defined in claim 1, the operations further comprising causing, at least in part:
   setting of a Generic Address parameter to the first phone address;
   setting of a Called Party Number parameter to a Location Routing Number of a wireless communications service provider gateway mobile switching center; and
   setting of a Translated Called Number Indicator (TCNI) bit in a Forward Call Parameter.

6. The system as defined in claim 1, the operations further comprising:
   providing a first software program to the mobile device of the user; and
   presenting, via a user interface of the first software program, the calling party phone address enabling the user to screen the first call.

7. The system as defined in claim 1, the operations further comprising:
   providing a first software program to the mobile device of the user; and
   enabling the user, via a user interface of the first software program, to direct the first call to a telephonic device associated with the user.

8. The system as defined in claim 1, the operations further comprising:
   providing a first software program to the mobile device of the user; and
   enabling the user, via a user interface of the first software program, the user to compose a text message
   originating, from the first software program, a transmission of the text message to the calling party phone address.

9. The system as defined in claim 1, the operations further comprising:
   providing a first software program to the mobile device of the user; and
   enabling the user, via a user interface of the first software program, to originate the one or more subsequent calls.

10. The system as defined in claim 1, wherein the calling party phone address is presented on the mobile device of the user enabling the user to screen the first call.

11. The system as defined in claim 1, the operations further comprising:
    providing a first software program to the mobile device of the user; and
    transmitting over a data network to the first software program a first notification regarding the first call.

12. The system as defined in claim 11, the operations further comprising presenting in association with the first notification a call handling control regarding the first call.

13. The system as defined in claim 11, the operations further comprising transmitting over the data network to the first software program a second notification regarding the second call.

14. A system, comprising:
    a data network interface;
    a telecommunications interface;
    a call processing system, including at least one processing device, coupled to the data network interface and the telecommunications interface, the call processing system configured to perform operations, comprising:
       receiving a first call, intended for a user, from a first calling party, the first call directed to a first phone address, wherein the first call is associated with a calling party phone address;
       causing, at least in part, routing to be configured within a wireless communications service provider the user is subscribed to so as to inhibit the first call from being routed directly to a mobile computing device of the user without transit through the call processing system even if both the user and the first calling party are subscribers of the wireless communications service provider;

placing an outbound call via the wireless network of the wireless communications service provider the user is subscribed to, wherein call signaling parameters of the outbound call are configured to preserve the calling party phone address; and causing, at least in part, one or more subsequent calls from the mobile computing device of the user to be presented to one or more called parties with the first phone address.

15. The system as defined in claim 14, wherein placing the outbound call to the mobile computing device of the user comprises placing the outbound call via an SS7 ISUP (Signaling System 7 Integrated Services Digital Network User Part) Initial Address Message.

16. The system as defined in claim 14, the operations further comprising causing, at least in part:
    setting of a Generic Address parameter to the first phone address;
    setting of a Called Party Number parameter to a Location Routing Number; and
    setting of a Translated Called Number Indicator (TCNI) bit in a Forward Call Parameter.

17. The system as defined in claim 14, wherein a text message addressed to the first phone address routes to the user's wireless communications service provider for transmittal to the mobile computing device of the user.

18. The system as defined in claim 14, the operations further comprising:
    providing a first software program to the mobile computing device of the user; and
    presenting, via a user interface of the first software program, the calling party phone address enabling the user to screen the first call.

19. The system as defined in claim 14, the operations further comprising:
    providing a first software program to the mobile computing device of the user; and
    enabling the user, via a user interface of the first software program, to direct the first call to a telephonic device associated with the user.

20. The system as defined in claim 14, the operations further comprising:
    providing a first software program to the mobile computing device of the user; and
    enabling the user, via a user interface of the first software program, to compose a text message; and
    originating, from the first software program, a transmission of the text message to the calling party phone address.

21. The system as defined in claim 14, the operations further comprising:
    providing a first software program to the mobile computing device associated with the user; and
    enabling the user, via a user interface of the first software program, to originate the one or more subsequent calls.

22. The system as defined in claim 14, the operations further comprising:
    providing a first software program to the mobile computing device of the user; and
    transmitting, over a data network, to the first software program a first notification regarding the first call.

23. The system as defined in claim 22, the operations further comprising presenting in association with the first notification a call handling control regarding the first call.

24. A method of routing calls:
    receiving at a call processing system a first call, intended for a user, from a first calling party, the first call directed to a first phone address, wherein the first call is associated with a calling party phone address;
    placing an outbound call from the call processing system to a wireless network of a wireless communications service provider subscribed to by the user, wherein call signaling parameters of the outbound call are configured to preserve the calling party phone address;
    causing, at least in part, one or more subsequent calls from a mobile device of the user to be presented to one or more called parties with the first phone address; and
    receiving at the call processing system a second call intended for the user from a second calling party, the second call directed to the first phone address;
    causing, at least in part, routing to be configured within the wireless network so as to inhibit the second call from being routed directly to the mobile device of the user without transit through the call processing system even if both the user and the second calling party are subscribers of the wireless communications service provider.

25. The method as defined in claim 24, wherein the first phone address is not a phone number of the wireless communications service provider and has not been ported to the wireless communications service provider.

26. The method as defined in claim 24, wherein placing the outbound call to the wireless network comprises placing the outbound call to a mobile switching center associated with the wireless communications service provider via an SS7 ISUP (Signaling System 7 Integrated Services Digital Network User Part) Initial Address Message.

27. The method as defined in claim 24, the method further comprising causing, at least in part:
    setting of a Generic Address parameter to the first phone address;
    setting of a Called Party Number parameter to a Location Routing Number of a wireless communications service provider gateway mobile switching center; and
    setting of a Translated Called Number Indicator (TCNI) bit in a Forward Call Parameter.

28. The method as defined in claim 24, the method further comprising:
    providing a first software program to the mobile device of the user; and
    presenting, via a user interface of the first software program, the calling party phone address and enabling the user to screen the first call.

29. The method as defined in claim 24, the method further comprising:
    providing a first software program to the mobile device of the user; and
    enabling the user, via a user interface of the first software program, to direct the first call to a telephonic device associated with the user.

30. The method as defined in claim 24, the method further comprising:
    providing a first software program to the mobile device of the user; and
    enabling the user, via a user interface of the first software program, to originate the one or more subsequent calls.

31. The method as defined in claim 24, wherein the calling party phone address is presented on the mobile device of the user enabling the user to screen the first call.

32. The method as defined in claim 24, the method further comprising:
providing a first software program to the mobile device of the user; and
transmitting over a data network to the first software program a first notification regarding the first call.

33. A method of routing calls:
receiving at a call processing system a first call, intended for a user, from a first calling party, the first call directed to a first phone address, wherein the first call is associated with a calling party phone address;
wherein even if both the user and first calling party are subscribed to a wireless communications service provider, routing is configured within a wireless network of the wireless communications service provider to inhibit the first call from being routed directly to a mobile computing device of the user without transit through the call processing system;
placing an outbound call from the call processing system via the wireless network of the wireless communications service provider the user is subscribed to, wherein call signaling parameters of the outbound call are configured to preserve the calling party phone address; and
causing, at least in part, one or more subsequent calls from the mobile computing device of the user to be presented to one or more called parties with the first phone address.

34. The method as defined in claim 33, wherein placing the outbound call to the mobile computing device of the user comprises placing the outbound call via an SS7 ISUP (Signaling System 7 Integrated Services Digital Network User Part) Initial Address Message.

35. The method as defined in claim 33, the method further comprising causing, at least in part:
setting of a Generic Address parameter to the first phone address;
setting of a Called Party Number parameter to a Location Routing Number; and
setting of a Translated Called Number Indicator (TCNI) bit in a Forward Call Parameter.

36. The method as defined in claim 33, wherein a text message addressed to the first phone address routes to the user's wireless communications service provider for transmittal to the mobile computing device of the user.

37. The method as defined in claim 33, the method further comprising:
providing a first software program to the mobile computing device of the user; and
presenting, via a user interface of the first software program, the calling party phone address, thereby enabling the user to screen the first call.

38. The method as defined in claim 33, the method further comprising:
providing a first software program to the mobile computing device of the user; and
enabling the user, via a user interface of the first software program, to direct the first call to a telephonic device associated with the user.

39. The method as defined in claim 33, the method further comprising:
providing a first software program to the mobile computing device associated with the user; and
enabling the user, via a user interface of the first software program, to originate the one or more subsequent calls.

40. The method as defined in claim 33, the method further comprising:
providing a first software program to the mobile computing device of the user; and
transmitting, over a data network, to the first software program a first notification regarding the first call.

* * * * *

UNITED STATES PATENT AND TRADEMARK OFFICE
CERTIFICATE OF CORRECTION

Page 1 of 1

PATENT NO. : 8,942,688 B2
APPLICATION NO. : 14/218444
DATED : January 27, 2015
INVENTOR(S) : Leland W. Kirchhoff et al.

It is certified that error appears in the above-identified patent and that said Letters Patent is hereby corrected as shown below:

In the Drawings
Sheet 3 of 4 (FIG. 3) at line 10 (approx.), Change "1:04 am" to --11:04 am--.

In the Specification
In column 1 at line 9, Change "a continuation" to --which is a continuation--.

In the Claims
In column 12 at line 26, In Claim 8, change "the user to" to --to--.

Signed and Sealed this
Twenty-ninth Day of September, 2015

Michelle K. Lee
*Director of the United States Patent and Trademark Office*